July 21, 1925. 1,546,466
L. C. BAYLES
FLUID PRESSURE REGULATING VALVE
Filed Feb. 10, 1923 2 Sheets-Sheet 1

INVENTOR
Lewis C. Bayles.
BY
Herbert G. Ogden
HIS ATTORNEY

July 21, 1925.                                                                        1,546,466
L. C. BAYLES
FLUID PRESSURE REGULATING VALVE
Filed Feb. 10, 1923                     2 Sheets-Sheet 2
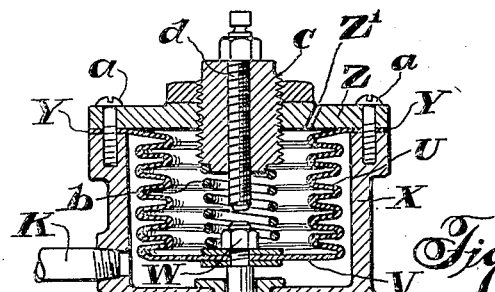
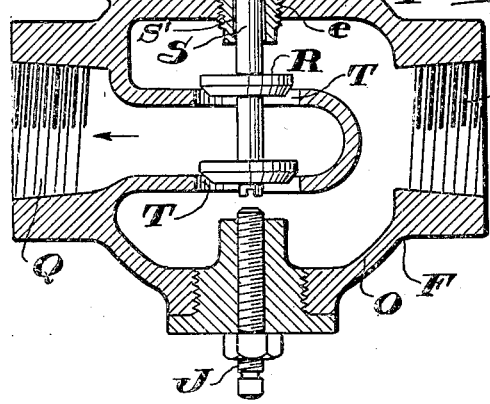
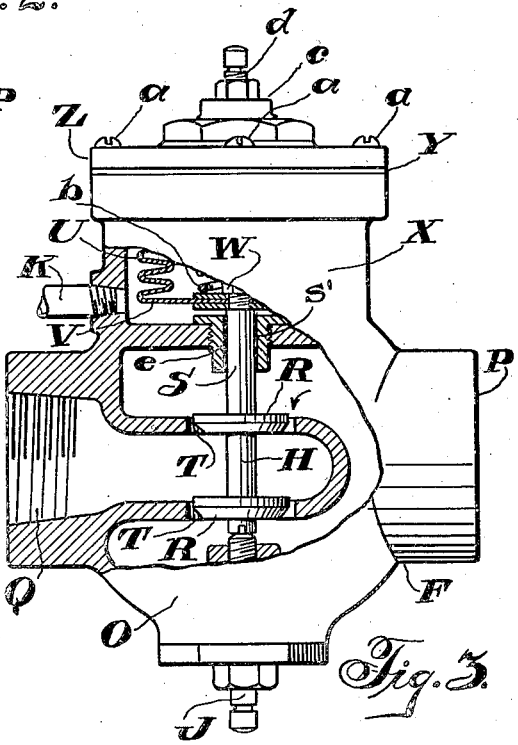
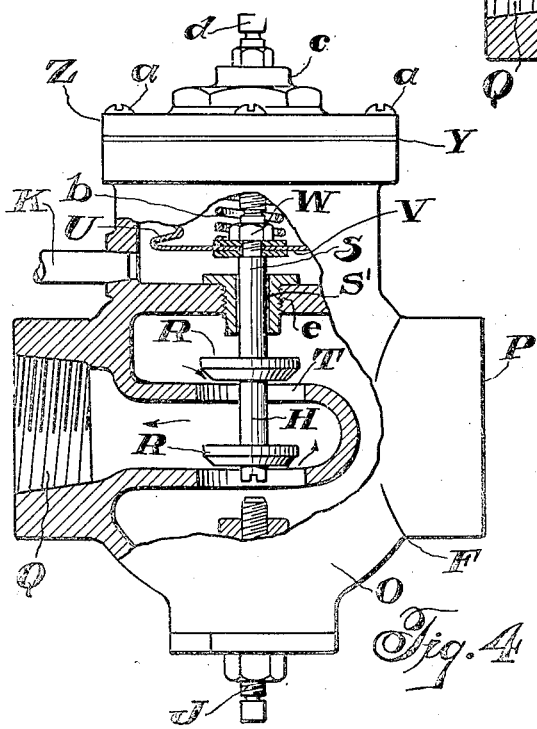
INVENTOR
Lewis C. Bayles.
HIS ATTORNEY Patented July 21, 1925.

1,546,466

UNITED STATES PATENT OFFICE.

LEWIS C. BAYLES, OF EASTON, PENNSYLVANIA, ASSIGNOR TO INGERSOLL-RAND COMPANY, OF JERSEY CITY, NEW JERSEY, A CORPORATION OF NEW JERSEY.

FLUID-PRESSURE-REGULATING VALVE.

Application filed February 10, 1923. Serial No. 618,237.

*To all whom it may concern:*

Be it known that I, LEWIS C. BAYLES, a citizen of the United States, and a resident of Easton, county of Northampton, State of Pennsylvania, have invented a certain Fluid-Pressure-Regulating Valve, of which the following is a specification accompanied by drawings.

This invention relates to fluid pressure valves for regulating the flow of fluid from the main supply line, as for instance the flow of compressed air to an air lift pump, thus controlling the output of the pump, although the valve may be used in any connection in which it is applicable, and the application to an air lift pump or series of pumps is stated as an example.

The objects of the invention are to enable the fluid pressure responsive device, which actuates the valve, to be controlled by fluid pressure independent of the pressure in the main supply line or in the outlet pipe from the valve casing, and make this control positive and extremely sensitive, so that small variations in the pressure to which the pressure responsive device is subjected will effect regulation of the flow through the valve.

The valve forming the subject matter of this application is like that shown in the co-pending application of myself and Herbert T. Abrams, for a regulator for air lift pumps, filed Feb. 24, 1923, Serial No. 620,900.

The valve is illustrated in the accompanying drawings as applied to a series of air lift pumps and in the drawings, Figure 1 is a diagrammatic view partly in longitudinal section of a series of wells having my automatic regulating valve applied thereto, as an illustration of one use.

Figure 2 is an enlarged detail sectional elevation showing the construction of the valve with the valve partly open.

Figure 3 is a similar view with the valve closed to its fullest extent and resting upon the adjustable stop for maintaining the valve partly open at all times, and Figure 4 is a similar view with the valve fully open.

Figure 1:
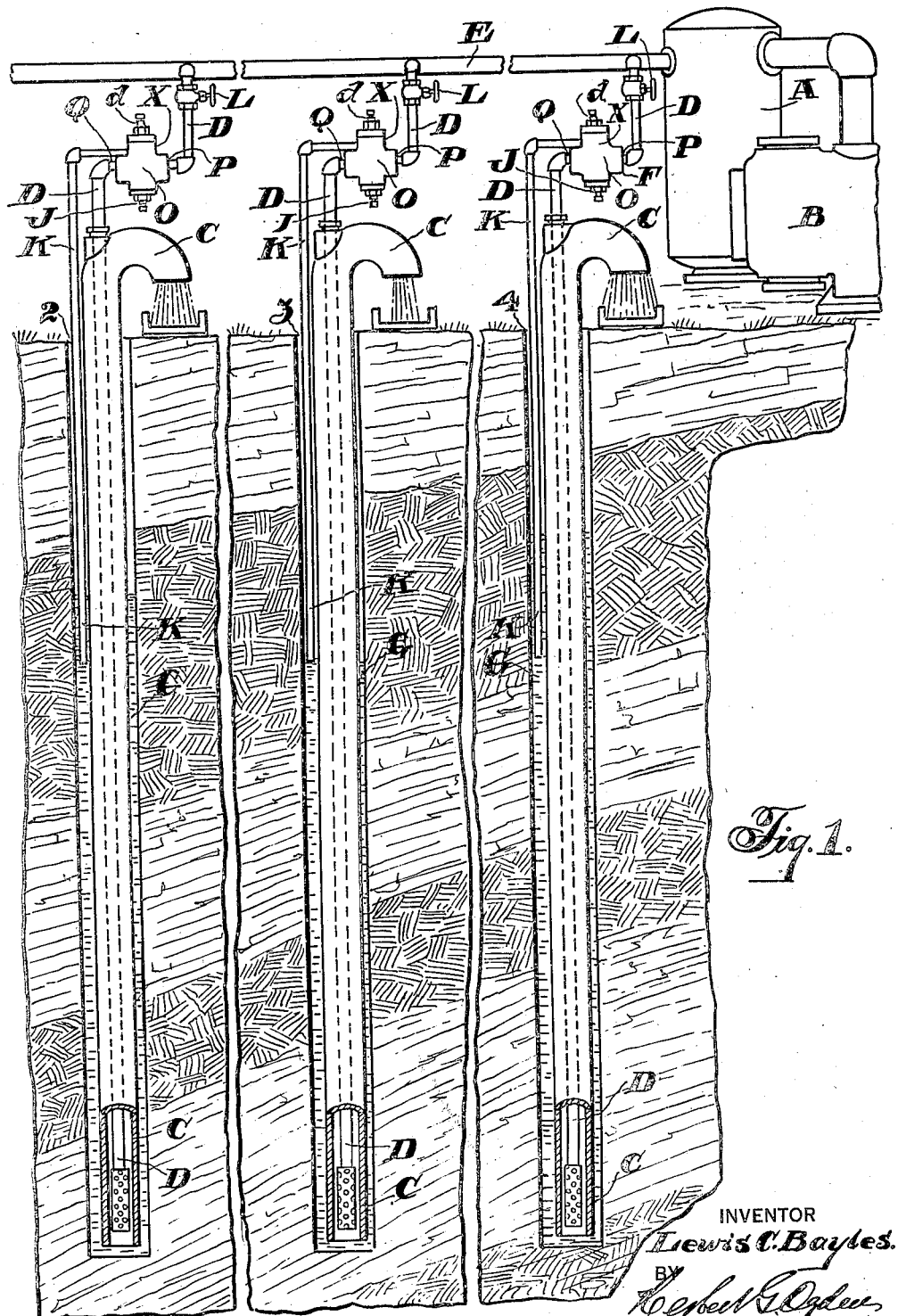

My valve is especially adapted to be inserted in the fluid pressure supply line of a pump at a convenient point, preferably above ground, for regulating the fluid pressure supply and thereby the output of the pump in accordance with changes in the level of the fluid in the well being pumped.

Such automatic regulation is especially useful with a series of pumps which are supplied at the same pressure from a single source of fluid pressure, as for instance an air compressor, because in that case a well in which the level has fallen lower than in the other will take an unduly large amount of air, thus seriously affecting the economy of that particular pump and depriving the remaining outfits of sufficient air for efficient operation. The application of my regulating valve prevents this un-economic operation.

As a well fills up and the level rises, more air is required and vice versa, but my valve may be made to operate substantially in accordance with such changes and this regulation may be accomplished by connecting a regulator pipe to the casing of the sensitive fluid pressure responsive device, and extending the regulator pipe into the well a sufficient distance to enable the lower end of the pipe to be submerged when the liquid in the well reaches a certain pre-determined height.

My valve is extremely sensitive, because constant leakage of the fluid is permitted under pressure to the said fluid pressure responsive device and down the regulator pipe, so that the liquid in the well is prevented from rising in the regulator pipe itself and the benefit of the full head of pressure, due to the rise in the level of the liquid in the well, around the regulator pipe, is obtained and is available for regulating purposes.

Referring to the drawings, Figure 1 illustrates a series of wells 2, 3 and 4, each having an air lift pump operated with compressed air from a receiver A to which a compressor B is connected. The eduction pipes C of the pumps extend to points near the bottoms of the wells, and fluid pressure supply pipes D extend to the lower submerged ends within the eduction pipes and are connected to the source of supply of fluid under pressure by the common supply pipe E. An automatic regulator F is inserted in each fluid pressure supply pipe D at a convenient point, as shown, preferably above ground, for regulating the fluid pressure supply in accordance with changes in the level of liquid G in the well being pumped.

In Figure 1 the position of the valve in each regulator F for the wells 2, 3 and 4, is assumed to correspond with the position of the valve H in each of the Figures 2, 3 and 4, for convenience of illustration. As shown in Figure 2 the valve of the regulator for well 2 is more fully open than normal and the level of the liquid G in said well is at a point intermediate the levels of the liquid in the wells 3 and 4. In Figure 3, the regulator valve H is shown in normal partially closed position resting upon the adjustable stop J and has been closed as far as the stop will permit closing, so that some air is still being passed down the supply pipe. The liquid level in well 3 has fallen to a point at or below the lower end of the regulator pipe K, so that there is substantially no pressure in said pipe. Figure 4 shows the regulator valve H fully open, and the liquid level in well 3 is at substantially the highest point, at which the maximum amount of air is required for the well. Throttle valves L may be provided for each pump, in the supply pipes B, as is customary. It is to be understood that the valve H of the regulator is constantly open and never fully closed, so that some air is always passing into the pipe D.

Referring more particularly to the construction of the regulator illustrated in detail in Figures 2, 3 and 4, the regulator comprises a valve casing O, to which the fluid pressure supply pipe D and the source of supply, may be connected at the inlet opening P. The opening Q in the valve casing is connected to that portion of the pipe D leading into the eduction pipe C of the well although the function of these openings P and Q may be reversed if desired and the opening Q may become the inlet to the valve casing, while the opening P becomes the outlet. The valve H in the casing may be of any suitable form, preferably of the duplex construction shown having two valve discs R on a single stem S, as this construction has been found to operate satisfactorily and well. The valve controls a port or ports T leading to the air supply pipe so that the quantity of air passing to a well is regulated in accordance with the requirements.

A fluid pressure responsive device, preferably in the form of a sylphon or corrugated collapsible metallic diaphragm U of general cylindrical shape, is connected to the valve stem S to actuate said valve and in this instance, the head V of the diaphragm is connected to the stem S as by means of the nut W. The diaphragm is located within a fluid tight regulator chamber formed by the casing walls X and the edge or lip Y of the diaphragm is secured between the casing walls X and the cover or cap Z as by means of the screws a. The cover Z is provided with the vent Z', for venting the inside of the sylphon but not the regulator chamber. The only vent from the regulator chamber is through the regulator pipe K until said pipe is sealed by the rising liquid in the well.

The upward or opening movement of the valve H and the collapsing movement of the diaphragm is opposed by a suitable force which may be exerted by a coiled spring b held in position within the diaphragm by means of a screw threaded plug c having an adjustable stop d therein against which the valve spindle S may impinge in order to limit the opening movement of the valve.

The regular chamber formed within the casing walls X is connected to the regulator pipe K which extends downwardly into the well a sufficient distance to enable its lower end to be submerged to a greater or less extent, depending upon the level of the fluid in the well, as indicated in Figure 1. The rise and fall of fluid in the well around the submerged end of the regulator pipe K tends to create variations or fluctuations of pressure in the pipe which are utilized for regulating purposes. In order that a small rise in the level of the water or fluid in a well around the submerged end of the regular pipe K may create sufficient pressure to actuate or collapse the diaphragm U, constant leakage of fluid under full line pressure is permitted from the valve casing O directly to the chamber within the casing walls X, in which the diaphragm U is located and while the provision for leakage may be accomplished in several ways, sufficient leakage may be provided through the clearance shown at S' between the valve stem S and the valve stem bushing t in which the stem moves. It is to be understood that this clearance amounts to a few thousandths of an inch. By eliminating a stuffing box at this point, and providing the clearance, the desired leakage takes place and the friction is reduced to a minimum thus making the device more sensitive. The air leaking into the chamber within the casing walls X may pass to atmosphere through the regulator pipe K if the lower end of the said pipe is open as indicated in the diagram of the well 3 of Figure 1. When the liquid in the well rises above the lower end of the regulator pipe, the leakage of air will prevent the liquid from rising within the pipe, and pressure is created within the pipe depending upon the height of the liquid level. The pressure thus transmitted to the diaphragm U will tend to collapse the diaphragm to a given extent and more fully open the valve H to a certain degree, and supply the required quantity of air to the pump. By adjusting the tension of the opposing spring $b$ in the regulator, the pressure limits between which the regulator will act may be determined, so that the regulator pipe K may be of any indefinite length, extending down into the liquid in the well, and the regulator may be set to act as the level of the liquid in the well rises beyond a pre-determined point.

I claim:

1. A fluid pressure regulating valve comprising a valve casing having main supply and outlet connections to be controlled, a constantly open valve in said casing, a fluid tight regulator chamber having a normally open vent adapted to be sealed to atmosphere, a fluid pressure responsive device in said regulator chamber, a valve stem connecting said fluid pressure responsive device with the valve to move the valve to more fully open position and to normal partially closed position, means for constantly permitting leakage of fluid under full line pressure from the main supply to said regulator chamber, but insufficient to actuate the fluid pressure responsive device, and a connection to said regulator chamber vent for subjecting said fluid pressure responsive device to a fluctuating regulating pressure in the outlet from the valve casing, when said connection to the vent is sealed.

2. A fluid pressure regulating valve comprising a valve casing having main supply and outlet connections to be controlled, a constantly open valve in said casing, a fluid tight regulator chamber having a normally open vent adapted to be sealed to atmosphere, a fluid pressure responsive device in said regulator chamber, a valve stem connecting said fluid pressure responsive device with the valve to move the valve to more fully open position and to normal partially closed position, an adjustable spring opposing the opening movement of the valve and assisting the movement towards normal partially closed position, means for constantly permitting leakage of fluid under full line pressure from the main supply to said regulator chamber, but insufficient to actuate the fluid pressure responsive device, and a connection to said regulator chamber vent for subjecting said fluid pressure responsive device to a fluctuating regulating pressure independent of the main supply pressure or the pressure in the outlet from the valve casing, when said connection to the vent is sealed.

In testimony whereof I have signed this specification.

LEWIS C. BAYLES.